No. 619,364. Patented Feb. 14, 1899.
W. F. STIMPSON.
SPRING COMPUTING SCALE.
(Application filed June 6, 1895.)
(No Model.) 2 Sheets—Sheet 1.
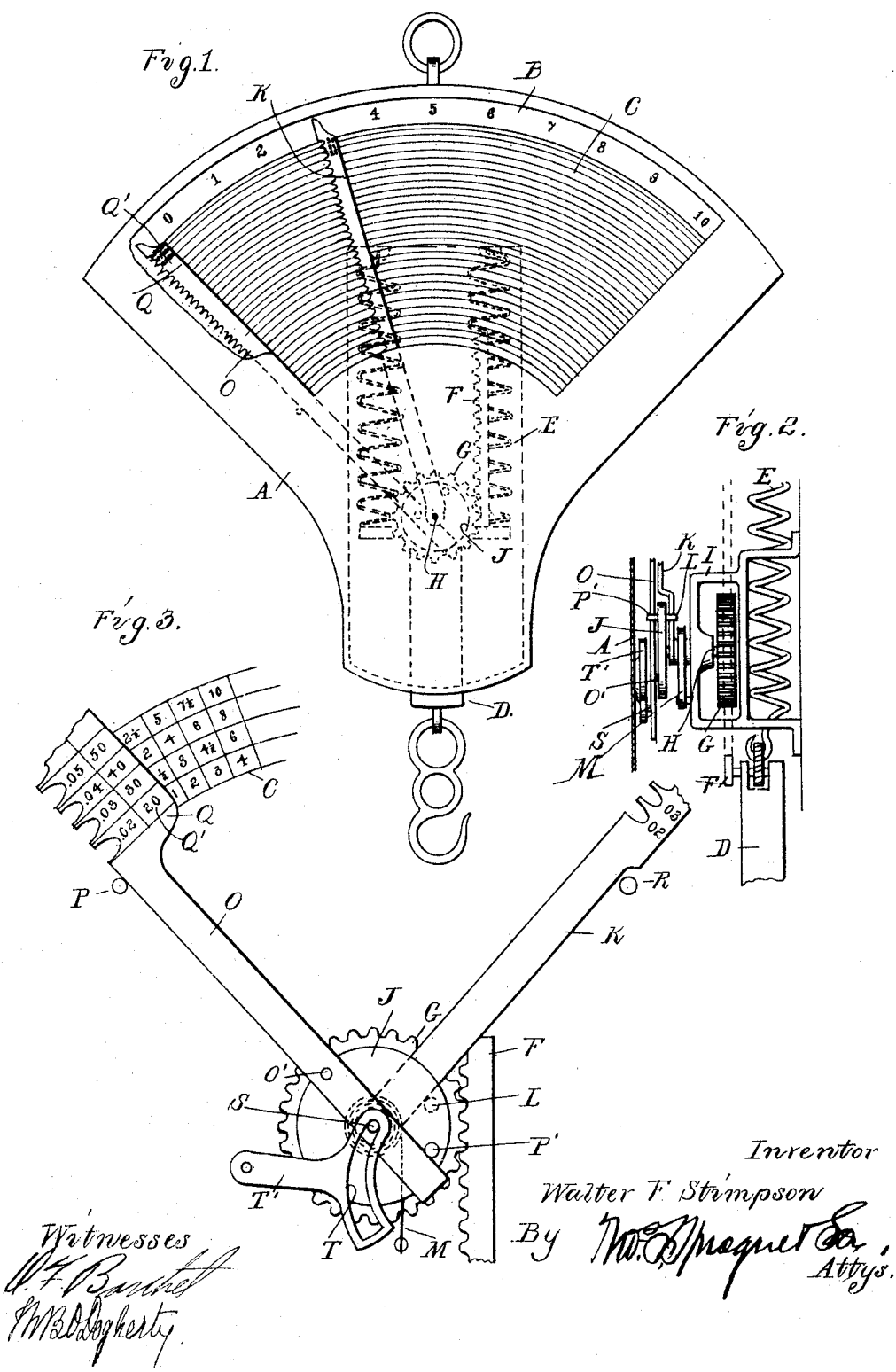

No. 619,364. Patented Feb. 14, 1899.
W. F. STIMPSON.
SPRING COMPUTING SCALE.
(Application filed June 6, 1895.)
(No Model.) 2 Sheets—Sheet 2.

Witnesses
Inventor
Walter F. Stimpson
By Attys.

THE NORRIS PETERS CO., PHOTO-LITHO., WASHINGTON, D. C.

UNITED STATES PATENT OFFICE.

WALTER F. STIMPSON, OF MILAN, MICHIGAN.

SPRING COMPUTING-SCALE.

SPECIFICATION forming part of Letters Patent No. 619,364, dated February 14, 1899.

Application filed June 6, 1895. Serial No. 551,815. (No model.)

*To all whom it may concern:*

Be it known that I, WALTER F. STIMPSON, a citizen of the United States, residing at Milan, in the county of Washtenaw and State of Michigan, have invented certain new and useful Improvements in Spring Computing-Scales, of which the following is a specification, reference being had therein to the accompanying drawings.

The invention consists in the construction of a computing spring-scale, and particularly in the construction of the devices for indicating the computations for the various weights at the various prices per pound without in any wise affecting the weighing qualities of the scale, which will greatly enlarge the computing capacity and which can be indicated with a single scale, and, further, in the construction, arrangement, and combination of the various parts, all as more fully hereinafter described and claimed.

Figure 1:
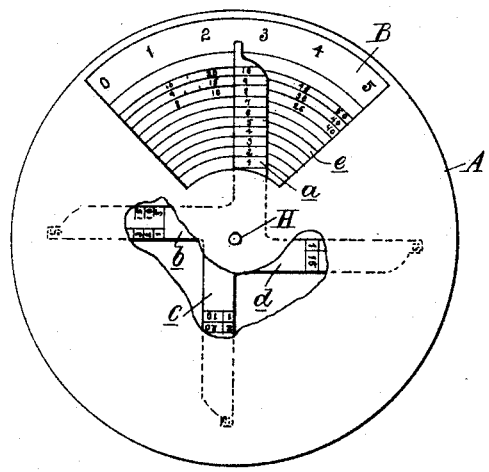
Figure 6:
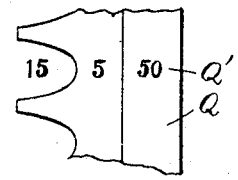
Figure 4:
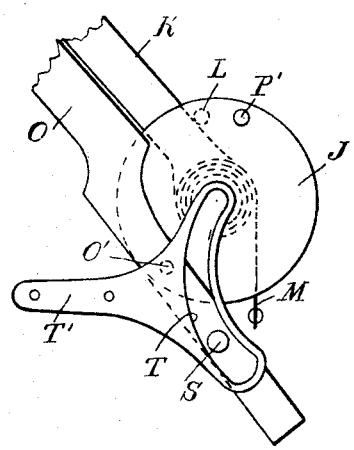
Figure 5:
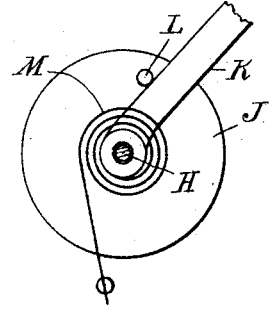

In the drawings, Figure 1 is a front elevation of a scale embodying my invention. Fig. 2 is a vertical central section illustrating the construction of the operating mechanism. Fig. 3 is a front elevation of the pointers and the pointer actuating or controlling disk. Fig. 4 is an elevation of the parts shown in Fig. 3, showing the pointers in different positions. Fig. 5 is a rear elevation of the controlling-disk and the spring-actuated pointer. Fig. 6 is an enlarged elevation of a portion of the pointer. Fig. 7 is a front elevation of a scale-dial, showing a slightly-modified construction of pointer.

My device embodies the usual spring weighing mechanism, with a dial-plate showing the pounds and a table of computations made up by multiplying the price per pound by the weight, with two or more pointers, arms, or indices actuated or controlled by the weighing mechanism and adapted to successively pass over the dial, the primary pointer, arm, or index carrying only the price per pound, while the succeeding or secondary pointers, arms, or indices carry multiples of the price per pound to be added to the computations on the dial-plate.

In the drawings I have shown two ways of carrying out my invention. Figs. 1 to 6 show a system of rocking or oscillating indices, and in Fig. 7 I show a series of arms rotating about a common axis to effect the same result. The latter form is the simpler and preferable one, although both come within the spirit of my broad invention. I will first describe the construction shown in Figs. 1 to 6.

A is the frame, preferably of the shape as shown and having suitable means for suspending it and the usual segmental weight indications, as shown at B. Below the weight-indications is the computed table C. D is the weighing-bar, on which the article to be weighed may be suspended by being hooked in the hook at the lower end thereof or by being supported on a weighing-pan. (Not shown.) This weighing-bar connects to the springs E and carries the rack-bar F, meshing with the pinion G on the shaft H, journaled in a suitable supporting frame or bracket I, so combined that as the weighing-bar is moved up and down the shaft will be rotated. These parts are of the known and usual construction in such spring-scales. Upon the shaft H is secured the disk J. Between the disk J and the bracket the lower end of the pointer K is journaled loosely on the shaft H. This pointer is held normally against a pin or shoulder L on the disk by the tension of the coiled spring M, so that as the disk is rotated to the right, Fig. 3, the spring will carry the pointer correspondingly across the face of the dial-plate. This pointer is marked with the prices per pound, and as it reaches any desired point it will indicate the value of the article at any price per pound which may be marked upon it, the operator reading the computed value from the table opposite the price per pound on the pointer. With this construction it is evident that no power is required from the weighing mechanism to move the pointer across the face of the dial, and, in fact, assists some in overcoming the friction of the parts, thereby adding to the delicacy of operation of a scale to which it is applied.

I have shown a dial-plate in Fig. 1 having weight indications up to ten pounds. When the pointer K has reached the ten-pound mark, I provide a second pointer, which will commence to travel over the indicator-dial. The construction which I employ in this type of scale for this second pointer is that shown in Figs. 3 and 4, in which I have shown a pointer O, pivoted upon a pin O' on the outer face of the disk J and away from the center thereof. The upper end of this pointer rests upon a shoulder or pin P. While the pointer K is traveling across the face of the dial the pointer O will not be operative, but will remain in the position as shown at the left hand in Fig. 1, the casing of which is broken away slightly to show this pointer. When the pointer K moves off the dial, the pin P' on the disk J will strike the end of the pointer O, and further movement of the disk will carry the pointer O across the dial. This pointer, in addition to carrying the price per pound, as does the pointer K, is provided with a lateral extension Q, upon which are marked opposite each price per pound the computations Q', which are formed by multiplying the price per pound with the highest weight indicated upon the dial, in this case ten pounds, so that the operator in using the scale adds to the proper computation upon the dial-plate the computation upon the pointer O, thereby obtaining the computations of the article at any given price per pound between ten and twenty pounds in weight. While the pointer O is traveling across the dial the pointer K is supported upon a pin or top R in the casing, as shown in Fig. 3. To prevent the pointer O from having an unsteady motion or from falling forward after it passes its vertical point, I provide a support for that pointer comprising a pin S in line with the shaft H, engaging in a slotted bearing T in the bracket T', the pointer being thus fulcrumed upon a pin S as soon as it commences to travel over the face of the dial.

It will be observed that when the pointer K is traveling over the dial the pointer O in no wise affects the free operation of the weighing mechanism, and that when the pointer O is traveling over the dial the pointer K is supported by the pin R. Thus the work required of the weighing mechanism in moving the pointers is reduced to a minimum. In the initial position of the parts the two pointers will extend substantially in the position shown in Fig. 4.

It is desirable to have the pin S run in a closed slot, so that when the scale is handled or shipped it cannot get out of position. The lower end of this slot I preferably enlarge, as shown, so that except at the point of bearing in the normal operation of the parts the pin will not touch the slotted bracket.

I will now describe the construction illustrated in Fig. 7, and this, as before mentioned, is a very much simpler form of my device and is a preferable one to manufacture, both because of its cheapness and simplicity as well as its reliability in weighing.

In the construction shown in Fig. 7 I have shown four arms or pointers $a\ b\ c\ d$, connected together and to the shaft H in such relation to the dial $e$ that as one pointer moves off of the dial the other will move on. The first pointer is marked only with the price per pound, the second pointer is marked with the price per pound and computations, as described, for the pointer-dial O, and the third and fourth pointers are marked for similar computations only arrived at by using larger multiplies of five as the multiplicator.

What I claim as my invention is—

1. In a spring-scale, the combination of the weighing mechanism, an indicating-dial having indicated thereon the weights and a computed table of prices, a pointer having the price per pound thereon adapted to be moved across the dial, a second pointer adapted to be moved across the dial after the first one has passed across, means for moving the pointers, weight-actuated means common to both pointers for controlling the same, said second pointer having the price per pound and bearing besides the price per pound multiples of the price per pound indicated by the first pointer.

2. In a spring-scale the combination of the pointer O, the dial, the disk J to which the pointer is pivoted, the weighing mechanism for actuating the disk, and the pin P' on the disk opposite the pivotal point of the pointer, adapted to strike the end of the pointer to move it, substantially as described.

3. In a spring-scale, the combination of the weighing mechanism, the disk J actuated thereby, the dial, the pointer O pivoted on the disk, the oppositely-arranged pin P' on the disk, to actuate the pointer, and a pivotal support for the pointer in its operative position centrally of the disk, substantially as described.

4. In a spring-scale, the combination of the weighing mechanism, the disk J actuated thereby, the dial, the pointer O pivoted on the disk, the oppositely-arranged pin P' on the disk to actuate the pointer, the slotted bracket T, and a pivot-pin on the pointer adapted to engage a bearing therein centrally of the disk, substantially as and for the purpose described.

5. In a spring-scale, the combination with a dial and weight-actuated mechanism, of a plurality of indicating-arms, means common to both arms for controlling the same, the primary arm having price indications thereon, and the secondary arm having price indications and computation indications of the forward-arm indications, and means for moving the arms, substantially as described.

6. In a computing-scale, the combination with a weight and price indicating dial, of a series of two or more arms or indices, each having thereon prices per pound registering with the computations on the dial, and the index or indices after the first having thereon besides the price per pound the highest value indicated by the next preceding arm or index, and weight-actuated means for controlling these arms or indices.

7. In a computing-scale, the combination of a weight and price indicating dial, a series of indices or arms each bearing characters indicating the prices per pound adapted to register with the indications on the dial, one of the members of the scale having indicated thereon the highest values indicated by the arms or indices preceding the last of the series, and weight-actuated means for controlling the movement of the indices.

8. In a computing-scale, the combination with a stationary weight and price indicating dial in the segment of a circle, of a series of indices, each having the same prices per pound thereon, adapted to register with corresponding computations on the dial, and weight-actuated means for controlling and permitting the movement of said indices successively across the dial, but one index being in operative position at any one time.

9. In a computing-scale, the combination of a segmental weight and price indicating dial, of a series of indices or arms, each bearing the same price per pound, adapted to be moved to register with the said segment of the dial successively, one index moving into registering position to the segment as the preceding one moves out of registering position whereby but one index registers at any one time.

In testimony whereof I affix my signature in presence of two witnesses.

WALTER F. STIMPSON.

Witnesses:
M. B. O'DOGHERTY,
O. F. BARTHEL.